(No Model.)
J. N. JOHNSON.
CULTIVATOR.
No. 306,623. Patented Oct. 14, 1884.
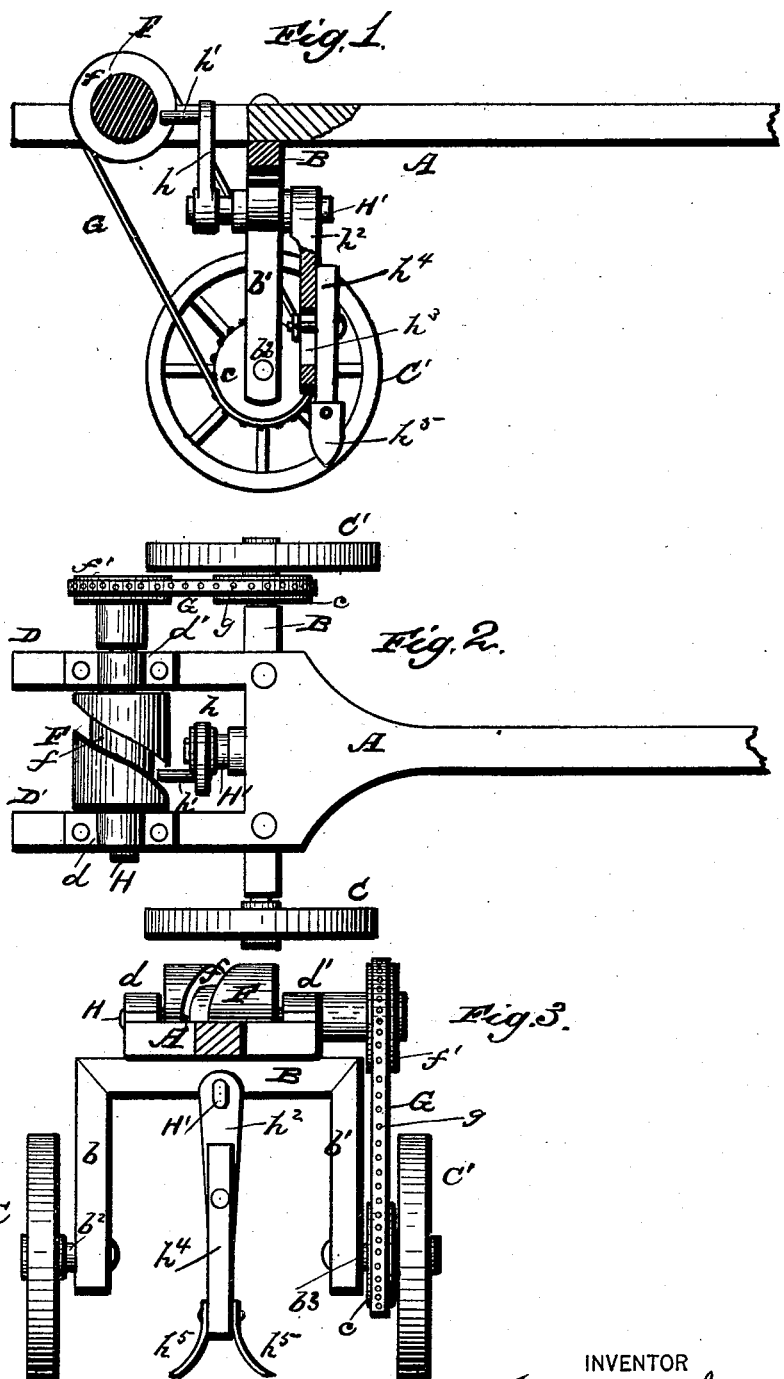
WITNESSES
INVENTOR
James N. Johnson
by Anderson Smith
his ATTORNEYS

UNITED STATES PATENT OFFICE.

JAMES N. JOHNSON, OF BUFFALO, ILLINOIS.

CULTIVATOR.

SPECIFICATION forming part of Letters Patent No. 306,623, dated October 14, 1884.

Application filed June 28, 1884. (No model.)

*To all whom it may concern:*

Be it known that I, JAMES N. JOHNSON, a citizen of the United States, residing at Buffalo, in the county of Sangamon and State of Illinois, have invented certain new and useful Improvements in Cultivators; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my device. Fig. 2 is a plan view of the same, and Fig. 3 is a front view.

The invention belongs to that class of agricultural implements used to heap the soil around the shoots of sprouting or growing corn, cotton, or other crops planted in rows. Such implements are frequently called "hillers," but are, properly, cultivators.

The object of the invention is to cultivate or hill two adjacent rows simultaneously, or while the machine is driven in one direction; and it consists, essentially, in fixing to a transverse shaft having bearings in the frame of the machine a cam-roller and a pulley, the former rotated by one of the wheels by means of any proper connecting mechanism, and the latter actuating a lever which vibrates a depending arm, on the lower end of which the proper cultivator-points are attached.

In the accompanying drawings, A is the tongue of the machine, bolted to the transverse beam B, from the ends of which extend vertically downward the equal and similar arms, $b$ and $b'$, furnished at their lower ends with the transverse bearings $b^2$ and $b^3$, respectively. The axle of the wheel C journals in the bearing $b^2$, and the axle of the opposite and equal wheel, C', journals in the bearing $b^3$, having upon it the pulley, or, if necessary, the sprocket-wheel $c$ between said wheel and bearing. The arms $b$ $b'$ and wheels C C' are situated at equal distances from the tongue, on each side of the same.

D D' are equal and similar parallel arms, extending backward from the widened rear end of the tongue, and provided at their rear ends with the transverse bearings $d$ $d'$, respectively. The arms D D' are equally distant laterally from the tongue, and have considerable space between them.

H is a shaft journaled in the bearings $d$ $d'$, and having fixed upon it between the same the cam-roller F, provided with the cam-groove $f$ on its face.

$f'$ is a pulley, or, if necessary, a sprocket-wheel, fixed to the end of the shaft H, projecting outward from the bearing $d'$.

G is a band connecting the pulleys $c$ and $f'$, by which motion is communicated from the former to the latter, and the shaft revolves when the wheel C' is in rotation, (*i. e.*, when the machine is moving.) When $c$ and $f'$ are sprocket-wheels, holes $g$ $g$ have to be made in the band to accommodate the pins on the same; or a chain may be substituted for the band.

H' is a horizontal rod journaled longitudinally in a proper bearing fixed centrally to the lower surface of the beam B.

$h$ is an arm extending vertically upward from the rear end of said rod, behind the beam B, and having on its upper end a pin, $h'$, to enter the groove $f$ of the cam-roller, which groove is so formed as to vibrate the arm when the cam-roller revolves.

$h^2$ is an arm extending vertically downward from the front end of the rod H', in front of the beam B, and provided with the longitudinal slot $h^3$ near its lower end.

$h^4$ is a bar having attached on each side of its lower end proper cultivator-points, $h^5$ $h^5$, and attached to the arm $h^2$ by means of a set-screw passing through the slot $h^3$. The said slot and screw render the bar $h^4$ both laterally and longitudinally adjustable on the arm $h^2$.

The operation of the machine is as follows: When the machine moves forward, the tongue being between two adjacent rows, the rotation of the wheel C' revolves the cam-roller by means of the pulleys or sprocket-wheels and connecting band or chain, and the cam-roller, by means of its groove and arm $h$, vibrates the arm $h^2$ from side to side, and causes the cultivator-points attached to the lower end of the latter to act successively toward the rows on both sides.

The bar $h^4$ is longitudinally adjusted to different points on the arm $h^2$, according to the amount of earth it is desired to hill around the growing grain, and to hill more on one row than the other the said bar is adjusted and set to the proper side.

Having thus described my invention, what I claim as new, and desire to secure by Letters Patent, is—

In a cultivator, the combination, with the frame, constructed as described, having the rear parallel open extensions, of the cross-beam B, having the downwardly-extending arms $b\ b'$, the shaft H', carrying a crank-arm, as shown, to engage a cam-groove in the shaft H, the arm $h^2$ having its lower end vertically slotted, and the arm $h^4$, connected to the said arm $h^2$, and means, substantially as specified, for operating the same, as set forth.

In testimony whereof I affix my signature in presence of two witnesses.

JAMES N. JOHNSON.

Witnesses:
MAURICE SLATTERY,
JACOB W. FIDLER.